United States Patent
Heath et al.

(10) Patent No.: US 7,639,469 B2
(45) Date of Patent: Dec. 29, 2009

(54) POWER SOURCING EQUIPMENT HAVING AUTO-ZERO CIRCUIT FOR DETERMINING AND CONTROLLING OUTPUT CURRENT

(75) Inventors: Jeffrey Lynn Heath, Santa Barbara, CA (US); David Mclean Dwelley, Santa Barbara, CA (US); John Arthur Stineman, Jr., Carpinteria, CA (US); Harry Joseph Kleeburg, Goleta, CA (US)

(73) Assignee: Linear Technology Corporation, Milpitas, CA (US)

( * ) Notice: Subject to any disclaimer, the term of this patent is extended or adjusted under 35 U.S.C. 154(b) by 393 days.

(21) Appl. No.: 11/227,289

(22) Filed: Sep. 16, 2005

(65) Prior Publication Data

US 2006/0165096 A1 Jul. 27, 2006

Related U.S. Application Data

(60) Provisional application No. 60/646,509, filed on Jan. 25, 2005.

(51) Int. Cl.
*H02H 7/00* (2006.01)
(52) U.S. Cl. ........................ 361/93.9; 361/18
(58) Field of Classification Search .................. 361/18, 361/91.1, 111, 93.7–93.9, 117–119
See application file for complete search history.

(56) References Cited

U.S. PATENT DOCUMENTS

| | | | | |
|---|---|---|---|---|
| 5,136,382 A * | 8/1992 | Meyer | ......................... | 348/465 |
| 6,973,394 B2 | 12/2005 | Jaeger et al. | | |
| 6,979,984 B2 * | 12/2005 | Perrier et al. | ............... | 323/281 |
| 7,006,815 B2 * | 2/2006 | Lehr et al. | ............... | 455/343.6 |
| 7,046,983 B2 * | 5/2006 | Elkayam et al. | ............. | 455/402 |
| 7,102,415 B1 * | 9/2006 | Potanin et al. | ............... | 327/427 |
| 7,453,245 B1 * | 11/2008 | Potanin et al. | ............... | 323/280 |
| 2002/0191553 A1 | 12/2002 | Lehr et al. | | |
| 2004/0201931 A1 * | 10/2004 | Korcharz et al. | ............. | 361/18 |
| 2004/0212423 A1 | 10/2004 | Inagaki | | |

FOREIGN PATENT DOCUMENTS

| | | |
|---|---|---|
| CN | 1333963 A | 1/2002 |
| CN | 1364026 A | 8/2002 |
| CN | 1157022 C | 7/2004 |
| CN | 1540858 A | 10/2004 |

(Continued)

OTHER PUBLICATIONS

Cisco "Power Over Ethernet; Cisco Inline Power And IEEE 802.3af";1994; pp. 1-13. (http://www.cisco.com/warp/public/cc/so/neso/bbssp/poeie_wp.pd.*

(Continued)

*Primary Examiner*—Danny Nguyen
(74) *Attorney, Agent, or Firm*—McDermott Will & Emery LLP

(57) ABSTRACT

A novel system and methodology for controlling an output of Power Sourcing Equipment in a Power over Ethernet system based on a current limit threshold. The PSE has an auto-zero circuit for comparing a monitored output current of the PSE with the current limit threshold to control the output of the PSE.

20 Claims, 3 Drawing Sheets

FOREIGN PATENT DOCUMENTS

EP          1 221 783 A1      7/2002

OTHER PUBLICATIONS

Galit Mendelson "All You Need To Know About Power Over Ethernet (PoE) And The IEEE 802.3af Standard"; 1994; pp. 1-24.(http://www.microsemi.com/PowerDsine/Documentation/WhitePapers/PoE_and_IEEE802_3af.pdf).*

Chinese Office Action issued in Chinese Patent Application No. 200680005472X dated Nov. 7, 2008.
Chinese Office Action issued in Chinese Patent Application No. 2006800031997 dated Nov. 7, 2008.
Chinese Office Action issued in Chinese Patent Application No. 2006800031925 dated Nov. 7, 2008.
English translation of Chinese Office Action issued in Chinese Patent Application No. CN 2006800054630, mailed Nov. 28, 2008.

* cited by examiner

POWER SOURCING EQUIPMENT HAVING AUTO-ZERO CIRCUIT FOR DETERMINING AND CONTROLLING OUTPUT CURRENT

This application claims priority of provisional U.S. patent application No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for determining and controlling output current of Power Sourcing Equipment (PSE) in a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting PoE detection signature defined by the IEEE 802.3af standard.

If the detection signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

When power is supplied to the PD, the IEEE 802.3af standard requires the PSE to check for an overcurrent condition by monitoring its output current with respect to certain current limit thresholds, such as the maximum output current of the PSE at a short circuit condition ($I_{LIM}$), and the overload current detection range ($I_{CUT}$). In particular, the PSE should be able to withstand without damage the application of short circuits of any wire to any other wire within a power supply cable, if the magnitude of the current through such a short circuit does not exceed $I_{LIM}$. Further, an overload condition may be detected when an output current of the PSE exceeds $I_{CUT}$ for a time period exceeding an overload time limit ($T_{ovld}$) set in the range between 50 ms and 75 ms. To comply with the IEEE 802.3af standard, a value of $I_{LIM}$ must be maintained in the range between 400 mA and 450 mA, while a value of $I_{CUT}$ must be kept at a level which is more than 15.4 W/$V_{Port}$ but less than 400 mA, where $V_{Port}$ is an output voltage of the PSE.

Also, the IEEE 802.3af standard requires the PSE to check for an undercurrent condition to make sure that the PD is drawing the minimum specified current. In particular, in accordance with the Maintain Power Signature (MPS) requirement, the PSE may monitor its output current to remove power from the port if the output current is below the IDLE state current ($I_{Min}$) for a time period greater than an MPS dropout time limit ($T_{MPDO}$). The IEEE 802.3af standard requires a value of $I_{Min}$ to be in the range between 5 mA and 10 mA.

Hence, the PSE is required to measure its output current to respond to an overcurrent condition when the output current exceeds the current limit thresholds and to respond to an undercurrent condition when the output current is below a certain minimum value. Usually, the PSE measures its output current by determining a sense voltage across a sense resistor.

For thermal or voltage headroom reasons, it is desirable to make the sense resistor as small as possible, especially if the current has a wide dynamic range. For example, a 0.5Ω resistor may be used to comply with the IEEE 802.3af standard. Because of a low value of the sense resistor, a regular differential amplifier used for measuring the sense voltage and comparing the corresponding current with required threshold levels can cause significant errors due to an offset voltage associated with amplifier circuitry. For example, the offset voltage may be caused by dynamic conditions, such as thermal, light and radiation conditions, by differences in the size of the input stage transistors, by differences in the doping and base diffusion of these transistors, and other circuitry imperfections. Due to the offset voltage, the differential amplifier may produce some signal at its output even when voltages applied to its inputs are the same.

Therefore, it would be desirable to provide a PSE with a current measuring circuit that would compensate for the offset voltage of the amplifier circuitry to produce a correct value at the output of the amplifier.

SUMMARY OF THE DISCLOSURE

The present disclosure offers a novel system and methodology for controlling an output of a PSE based on a current limit threshold. In accordance with one aspect of the disclosure, a PSE comprises an auto-zero circuit for comparing a monitored output current of the PSE with the current limit threshold to control an output of the PSE. The auto-zero circuit may include an auto-zero comparator or an auto-zero amplifier For example, the auto-zero amplifier may compare the monitored output current with a maximum output current of the PSE at a short circuit condition to control the output current so as to prevent it from exceeding the maximum output current of the PSE at a short circuit condition.

Further, the auto-zero comparator may compare the monitored output current with an overload current detection range to remove power from the output of the PSE when the output current exceeds the overload current detection range for a time period exceeding a first predetermined time interval.

Moreover, the auto-zero comparator may be configured for comparing the monitored output current with a predetermined minimum current to remove power from the output of the PSE when the output current is below the predetermined minimum current for a time period exceeding a second predetermined time interval.

In accordance with an embodiment of the disclosure, the auto-zero circuit may be configured to monitor the output current of the PSE by monitoring a sense voltage across a sense resistor of the PSE. The auto-zero circuit may compare the sense voltage with a reference voltage representing the current limit threshold.

A control circuit may be provided for selectively supplying an input of the auto-zero comparator with a first reference signal representing an overload current detection range or with a second reference signal representing a predetermined minimum current.

The control circuit may monitor an output of the auto-zero comparator for determining when the sense voltage exceeds the first reference signals, and when the sense voltage becomes lower than the second reference signal.

The control circuit may activate a first timing device when the sense voltage exceeds the first reference signal to remove power from the output of the PSE if the sense voltage exceeds the first reference signal after a first predetermined time interval defined by the first timing device.

Also, the control circuit may activate a second timing device when the sense voltage is less than the second reference signal to remove power from the output of the PSE if the sense voltage is less than the second reference signal after a second predetermined time interval defined by the second timing device.

In accordance with a method of the present disclosure, the following steps are carried out to control an output of a PSE:
monitoring an output current of the PSE, and
supplying an output value representing the output current to one input of an auto-zero circuit for comparison with a current limit threshold supplied to another input of the auto-zero amplifier.

In accordance with another aspect of the disclosure a PoE system comprises a PSE for providing power to a Powered Device (PD), and control circuitry for controlling an output of the PSE based on a predetermined current threshold level. The control circuitry includes an auto-zero circuit for comparing an output current of the PSE with the predetermined current threshold level.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of utilizing an auto-zero circuit for monitoring an output current of a PSE with respect to the maximum output current of the PSE at a short circuit condition ($I_{LIM}$), the overload current detection range ($I_{CUT}$) and the IDLE state current ($I_{Min}$) in a Power over Ethernet (PoE) system. It will become apparent, however, that the concepts described herein are applicable to monitoring any output signal of the PSE with respect to any value.

Figure 1:
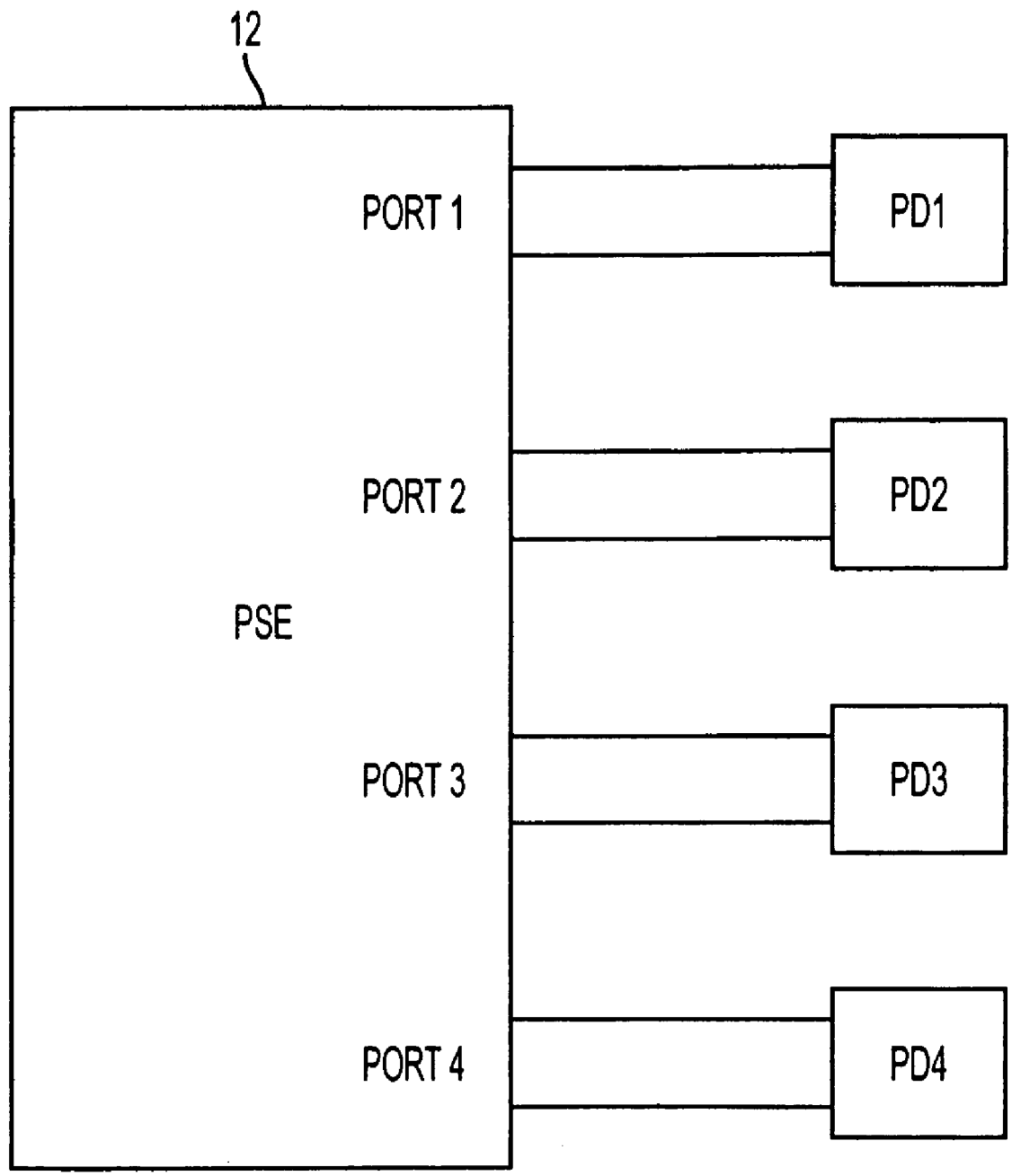
FIG. 1 is a block-diagram illustrating a PSE of the present disclosure.

FIG. 1 shows a simplified block-diagram illustrating a Power over Ethernet (PoE) system 10 including Power Sourcing Equipment (PSE) 12 having multiple ports 1 to 4 connectable to Powered Devices (PD) 1 to 4 via respective links, each of which may be provided using 2 or 4 sets of twisted pairs within the Ethernet cable. Although FIG. 1 shows four ports of the PSE 12, one skilled in the art would realize that any number of ports may be provided.

The PSE 12 may interact with each PD in accordance with the IEEE 802.3af standard. In particular, the PSE 12 and the PD participate in the PD detection procedure, during which the PSE 12 probes a link to detect the PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

When power is supplied to the PD, the PSE 12 checks for overcurrent and undercurrent conditions by monitoring its output current with respect to certain current limit thresholds, such as the maximum output current of the PSE at a short circuit condition ($I_{LIM}$), the overload current detection range ($I_{CUT}$), and the IDLE state current ($I_{Min}$).

In particular, the PSE 12 should be able to withstand without damage the application of short circuits of any wire to any other wire within a power supply cable, if the magnitude of the current through such a short circuit does not exceed $I_{LIM}$. Therefore, the PSE 12 may monitor its output current to prevent it from exceeding the $I_{LIM}$ level. A value of $I_{LIM}$ is maintained in the range between 400 mA and 450 mA.

Further, an overload condition may be detected when an output current of the PSE 12 exceeds $I_{CUT}$ for a time period exceeding an overload time limit ($T_{ovld}$) set in the range between 50 ms and 75 ms. A value of $I_{CUT}$ is kept at a level which is more than 15.4 W/$V_{Port}$ but less than 400 mA, where $V_{Port}$ is an output voltage of the PSE.

Also, to make sure that the PD is drawing at least the minimum specified current, an undercurrent condition may be detected if an output current of the PSE 12 is below the IDLE state current ($I_{Min}$) for a time period greater than an MPS dropout time limit ($T_{MPDO}$). A value of $I_{Min}$ is in the range between 5 mA and 10 mA.

Hence, the PSE 12 may measure its output current to respond to an overcurrent condition when the output current reaches the $I_{LIM}$ level and/or exceeds the $I_{CUT}$ level, and to respond to an undercurrent condition when the output current is below the $I_{Min}$ level. As discussed in more detail below, the PSE measures its output current by determining a sense voltage across a sense resistor.

For thermal or voltage headroom reasons, it is desirable to make the sense resistor as small as possible, especially if the current has a wide dynamic range. For example, a 0.5Ω resistor may be used to comply with the IEEE 802.3af standard. Because of a low value of the sense resistor, a regular differential amplifier used for measuring the sense voltage and comparing the corresponding current with required threshold levels can cause significant errors due to an offset voltage associated with amplifier circuitry. For example, the offset voltage may be caused by dynamic conditions, such as thermal, light and radiation conditions, by differences in the size of the input stage transistors, by differences in the doping and base diffusion of these transistors, and other circuitry imperfections. Due to the offset voltage, the differential amplifier may produce some signal at its output even when voltages applied to its inputs are the same.

To provide accurate measurement of the sense voltage across the sense resistor of a small value, the PSE 12 of the present disclosure includes an auto-zero circuit for monitoring the sense voltage and comparing it with a predetermined threshold level. An auto-zero circuit typically operates in two phases per clock cycle. In the first phase, it shorts its inputs together and stores the resulting offset internally. In the second phase, it outputs its difference input signal while the input offset error is compensated by the stored offset. As described below, the auto-zero circuit may be an auto-zero comparator or an auto-zero amplifier.

Figure 2:
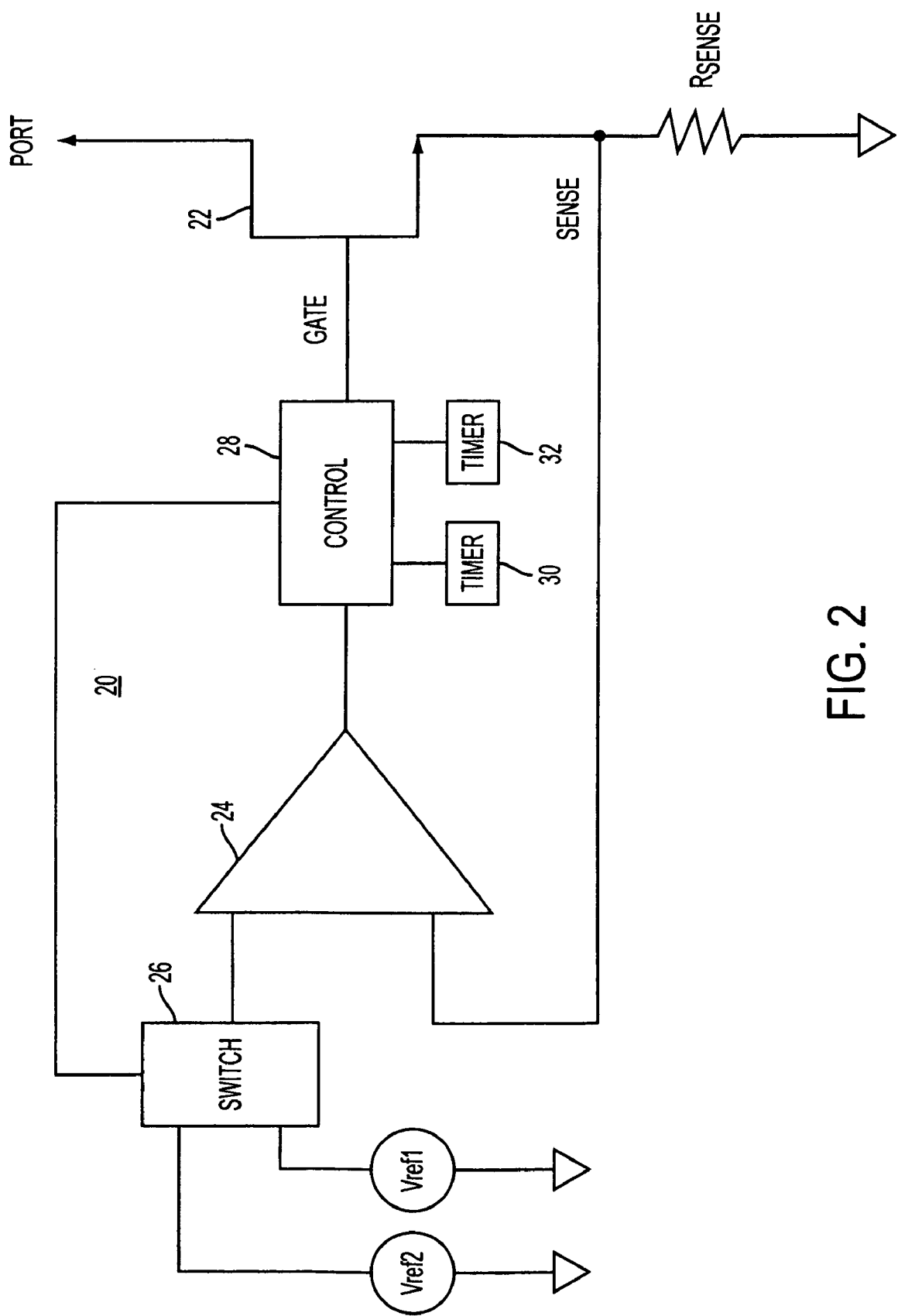
FIG. 2 is a diagram illustrating an auto-zero comparator for comparing an output current with current limit thresholds to remove power from an output of the PSE based on comparison results.

FIG. 2 illustrates an exemplary circuit 20 for removing power from an output port of the PSE 12 in response to an overload condition and/or an undercurrent condition. Delivery of power from the PSE 12 to a PD may be provided by controlling the gate drive voltage of a power MOSFET 22 via a terminal Gate. For example, the MOSFET 22 may couple −48V input supply to the PSE output port in a controlled manner that satisfies the PD's power requirement. The output current of the PSE 12 is measured via a terminal Sense by monitoring voltage Vsense across sense resistor Rsense coupled to the MOSFET 22. As discussed above, it is desirable to make the sense resistor Rsense as small as possible. For example, a 0.5Ω resistor may be used to comply with the IEEE 802.3af standard. The MOSFET 22, sense resistor Rsense, and terminals Gate and Sense may be provided for each of ports 1 to 4 of the PSE 12.

The Sense terminal is connected to a first input of an auto-zero comparator 24 to supply the auto-zero comparator 24 with a detected value of the sense voltage Vsense. A second input of the auto-zero comparator 24 is supplied with a reference voltage corresponding to a selected current limit threshold. For example, the auto-zero comparator 24 may compare the sense voltage Vsense with voltage $V_{CUT}=I_{CUT}\times$ Rsense or with voltage $V_{Min}=I_{Min}\times$Rsense, where Rsense is a resistance value of the sense resistor Rsense. A switch 26 may be provided for selectively supplying the second input of the auto-zero comparator 24 with the $V_{CUT}$ voltage from a first reference voltage source Vref1 or with the $V_{Min}$ voltage from a second reference voltage source Vref2.

The auto-zero comparator 24 compares the sense voltage Vsense with a selected reference voltage to produce an output digital signal of a first value when the sense voltage exceeds the selected reference voltage and to produce the output digital signal of second value when the sense voltage is below the selected reference voltage level. For example, when the sense voltage Vsense exceeds the $V_{CUT}$ voltage corresponding to the overload current detection range $I_{CUT}$, the auto-zero comparator 24 may produce a logical 1 at its output, and when the sense voltage Vsense is less than the $V_{Min}$ voltage corresponding to the IDLE state current $I_{Min}$, the auto-zero comparator 24 may produce a logical 0 at its output. One skilled in the art would realize that any comparator arrangement that performs an auto-zero procedure for eliminating offsets generated by the comparator circuitry may be used as the auto-zero comparator 24.

A single auto-zero comparator 24 may be shared by the ports 1 to 4 of the PSE 12 to monitor and control output currents supplied from each of the ports. Alternatively, a separate auto-zero comparator may be provided for each port.

Operations of the auto-zero comparator 24 are controlled by a controller 26 that controls the switch 26 in a prescribed manner to supply the second input of the auto-zero comparator 24 with the $V_{CUT}$ voltage from a first reference voltage source Vref1, and with the $V_{Min}$ voltage from a second reference voltage source Vref2. For example, the controller 26 may control the switch 26 to connect the input of the auto-zero comparator 24 to the first reference voltage source Vref1 in order to sequentially compare the output current from each of the ports 1 to 4 with the overload current detection range $I_{CUT}$. Thereafter, the controller 26 may switch the input of the auto-zero comparator 24 to the second reference voltage source Vref2 to sequentially compare the output current from each of the ports 1 to 4 with the IDLE state current $I_{Min}$. Alternatively, the output current from a first port may be compared with the overload current detection range $I_{CUT}$ and with the IDLE state current $I_{Min}$. Thereafter, the output current from the next port may be compared with the overload current detection range $I_{CUT}$ and with the IDLE state current $I_{Min}$, etc.

Simultaneously, the controller 26 analyzes the output of the auto-zero comparator 24 to determine whether the output current from the respective port is above the overload current detection range $I_{CUT}$, or below the IDLE state current $I_{Min}$. In particular, when the controller 26 switches the second input of the auto-zero comparator 24 to the first reference voltage source Vref1, it may detect a logic 1 at the output of the auto-zero comparator 24 indicating that a value of the sense voltage Vsense at the first input of the auto-zero comparator 24 is higher than a value of the $V_{CUT}$ voltage at the second input. In this case, the controller 28 starts a timer 30 programmed to count a value corresponding to an overload time limit $T_{ovld}$. If the sense voltage Vsense is still above the $V_{CUT}$ voltage when the time interval counted by the timer 30 expires, the controller 28 may pull down the respective Gate terminal to turn off the MOSFET 22 connected to this terminal.

Further, when the controller 26 switches the second input of the auto-zero comparator 24 to the second reference voltage source Vref2, it may detect a logic 0 at the output of the auto-zero comparator 24 indicating that a value of the sense voltage Vsense at the first input of the auto-zero comparator 24 is less than a value of the $V_{Min}$ voltage at the second input.

In this case, the controller 28 starts a timer 32 programmed to count a value corresponding to an MPS dropout time limit $T_{MPDO}$. If the sense voltage Vsense is still less than the $V_{Min}$ voltage when the time interval counted by the timer 32 expires, the controller 28 may pull down the respective Gate terminal to turn off the MOSFET 22 connected to this terminal.

Figure 3:
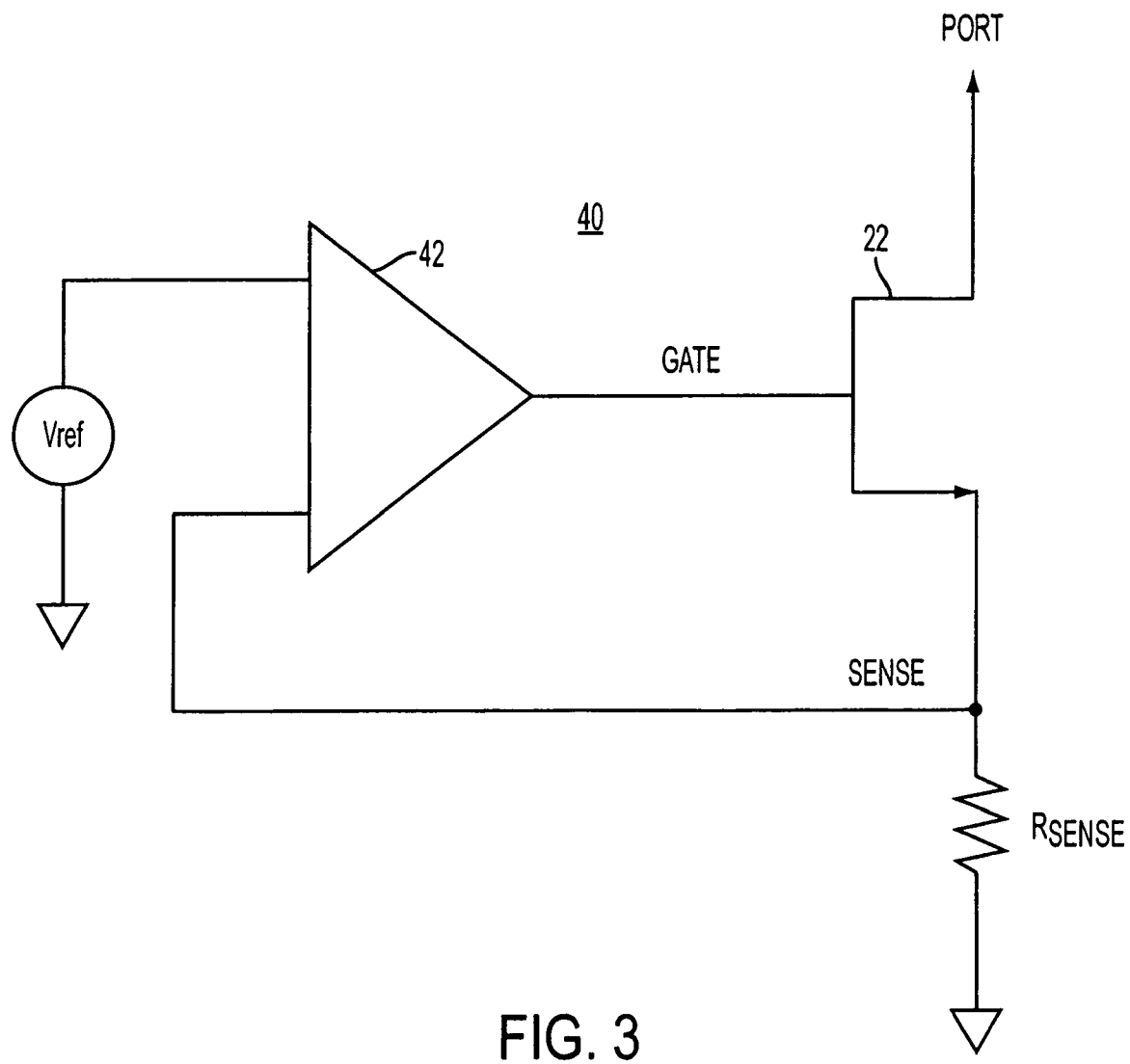
FIG. 3 is a diagram illustrating an auto-zero amplifier for controlling an output current of the PSE so as to prevent the output current from exceeding a current limit threshold.

FIG. 3 illustrates an exemplary circuit 40 for regulating the output current of the PSE to prevent a short-circuit condition. In particular, the circuit 40 regulates the output current so as to prevent it from exceeding the maximum output current of the PSE at a short circuit condition $I_{LIM}$.

As discussed above, the output current of the PSE may be measured via a terminal Sense by monitoring voltage Vsense across sense resistor Rsense coupled to the MOSFET 22. An auto-zero amplifier 42 may be provided for comparing the voltage Vsense with a reference voltage supplied from a reference voltage source Vref to control the gate voltage of the MOSFET 22. For example, the reference voltage may correspond to voltage $V_{LIM}=I_{LIM} \times Rsense$.

The voltage Vsense may be supplied to a first input of the auto-zero amplifier 42, whereas the voltage $V_{LIM}$ may be supplied to its second input. The output of the auto-zero amplifier 42 may produce a voltage corresponding to a difference between $V_{LIM}$ and Vsence. As the voltage Vsense increasing with an increase in the output current approaches $V_{LIM}$, the output of the auto-zero amplifier 42 responds by decreasing the voltage at the gate of the MOSFET 22. Reducing the voltage at the gate of the MOSFET 22 will result in an increase of the MOSFET resistance, which will in turn reduce the output current at a respective port of the PSE 12. One skilled in the art would realize that any auto-zero amplifier arrangement that responds to a difference signal at its inputs by producing an output signal of a respective value may be used as the auto-zero amplifier 42.

A single auto-zero amplifier 42 may be shared by the ports 1 to 4 of the PSE 12 to monitor and control output currents supplied from each of the ports. Alternatively, a separate auto-zero amplifier may be provided for each port.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. For example, instead of comparing the sense voltage with $I_{CUT}$, $I_{Min}$ and/or $I_{LIM}$ threshold values, the auto-zero amplifier of the present disclosure may compare any output signal of the PSE with any parameter of the PSE or PD.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. Power Sourcing Equipment (PSE) in a Power over Ethernet system, comprising:
   threshold setting circuitry for setting a current limit threshold, and
   an auto-zero circuit for comparing the current limit threshold with a monitored output current of the PSE to control an output of the PSE.

2. The PSE of claim 1, wherein the auto-zero circuit comprises an auto-zero amplifier for comparing the output current with a maximum output current of the PSE at a short circuit condition to prevent the output current from exceeding the maximum output current of the PSE at a short circuit condition.

3. The PSE of claim 1, wherein the auto-zero circuit comprises an auto-zero comparator for comparing the output current with an overload current detection range to remove power from the output of the PSE when the output current exceeds the overload current detection range for a time period exceeding a first predetermined time interval.

4. The PSE of claim 1, wherein the auto-zero circuit comprises an auto-zero comparator for comparing the output current with a predetermined minimum current to remove power from the output of the PSE when the output current is below the predetermined minimum current for a time period exceeding a second predetermined time interval.

5. The PSE of claim 1, wherein the auto-zero circuit is configured to monitor the output current of the PSE by monitoring a sense voltage across a sense resistor of the PSE.

6. The PSE of claim 5, wherein the auto-zero circuit is configured to compare the sense voltage with a reference voltage representing the current limit threshold.

7. The PSE of claim 3, wherein the threshold setting circuitry comprises a control circuit for selectively providing an input of the auto-zero comparator with a first reference signal representing an overload current detection range or with a second reference signal representing a predetermined minimum current.

8. The PSE of claim 7, wherein the control circuit is configured for monitoring an output of the auto-zero comparator for determining when a sense signal representing the output current of the PSE exceeds the first reference signals, and when the sense signal becomes lower than the second reference signal.

9. The PSE of claim 8, wherein the control circuit is configured to activate a first timing device when the sense signal exceeds the first reference signal to remove power from the output of the PSE if the sense signal exceeds the first reference signal after a first predetermined time interval defined by the first timing device.

10. The PSE of claim 9, wherein the control circuit is configured to activate a second timing device when the sense signal is less than the second reference signal to remove power from the output of the PSE if the sense signal is less than the second reference signal after a second predetermined time interval defined by the second timing device.

11. A method of controlling an output of a PSE, comprising the steps of:
   monitoring an output current of the PSE, and
   supplying an output value representing the output current to one input of an auto-zero circuit for comparison with a current limit threshold supplied to another input of the auto-zero amplifier.

12. The method of claim 11, wherein the output value represents a sense voltage across a sense resistor of the PSE.

13. The method of claim 11, wherein the output current is compared with a maximum output current of the PSE at a short circuit condition to prevent the output current from exceeding the maximum output current of the PSE at a short circuit condition.

14. The method of claim 11, wherein the output current is compared with an overload current detection range to remove power from the output of the PSE when the output current exceeds the overload current detection range for a time period exceeding a first predetermined time interval.

15. The method of claim 11, wherein the output current is compared with a predetermined minimum current to remove power from the output of the PSE when the output current is below the predetermined minimum current for a time period exceeding a second predetermined time interval.

16. A PoE system comprising:
a PSE for providing power to a Powered Device (PD), and
control circuitry for controlling an output of the PSE based on a predetermined current threshold level,
the control circuitry comprising an auto-zero circuit for comparing an output current of the PSE with the predetermined current threshold level.

17. The system of claim 16, wherein the auto-zero circuit is configured to compare a reference voltage representing the predetermined current level threshold with a voltage drop across a sense resistor of the PSE.

18. The system of claim 16, wherein the auto-zero circuit includes an auto-zero amplifier for comparing the output current with a maximum output current of the PSE at a short circuit condition to prevent the output current from exceeding the maximum output current of the PSE at a short circuit condition.

19. The system of claim 16, wherein the auto-zero circuit includes an auto-zero comparator for comparing the output current with an overload current detection range to remove power from the output of the PSE when the output current exceeds the overload current detection range for a time period exceeding a first predetermined time interval.

20. The system of claim 16, wherein the auto-zero circuit includes an auto-zero comparator for comparing the output current with a predetermined minimum current to remove power from the output of the PSE when the output current is below the predetermined minimum current for a time period exceeding a second predetermined time interval.

* * * * *

UNITED STATES PATENT AND TRADEMARK OFFICE
CERTIFICATE OF CORRECTION

PATENT NO. : 7,639,469 B2
APPLICATION NO. : 11/227289
DATED : December 29, 2009
INVENTOR(S) : Heath et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 644 days.

Signed and Sealed this

Twenty-first Day of December, 2010

David J. Kappos
*Director of the United States Patent and Trademark Office*